S. RUMOLINO.
ELECTRIC WELDING APPARATUS.
APPLICATION FILED JULY 26, 1916.

1,323,913.

Patented Dec. 2, 1919.
2 SHEETS—SHEET 1.

INVENTOR.
Santo Rumolino
BY
Singer
ATTORNEYS.

S. RUMOLINO.
ELECTRIC WELDING APPARATUS.
APPLICATION FILED JULY 26, 1916.

1,323,913.

Patented Dec. 2, 1919.
2 SHEETS—SHEET 2.

INVENTOR.
Santo Rumolino
BY
ATTORNEYS.

UNITED STATES PATENT OFFICE.

SANTO RUMOLINO, OF GENOA, ITALY.

ELECTRIC WELDING APPARATUS.

1,323,913.     Specification of Letters Patent.     Patented Dec. 2, 1919.

Application filed July 26, 1916. Serial No. 111,494.

*To all whom it may concern:*

Be it known that I, SANTO RUMOLINO, a subject of the King of Italy, residing at Genoa, Italy, have invented certain new and useful Improvements in Electric Welding Apparatus, of which the following is a specification.

This invention relates to improvements in the control of circuits for electric welding, and to improvements in the control of circuits for other applications of electrical current in which the intensity of the current fluctuates rapidly between very wide limits.

It is an object of the invention to provide a system of control for the current whereby destruction of the generator, through the wide fluctuations of current intensity, is avoided. It is for this purpose an object of the invention to dispose within the circuit of the generator, resistances which are automatically introduced into the circuit to consume the current furnished by the generator when the work or apparatus intended to consume the current for useful purposes is cut out of the current.

It is also an object of the invention to provide a plurality of resistances which are severally or jointly automatically introduced into the circuit of the generator when the current consuming device, as, for instance, the work-piece, is removed as a current conducting part; these resistances, however, being connected in series relatively to each other and being in this relation shunted to the work-piece when the latter is introduced as a current consuming part. The high resistance, consisting of the several resistance elements in series, then being shunted to the work-piece, it is obvious that the main current will flow through the relatively low resistance presented by the work, while a small portion of this current only will flow through the branch circuit provided by the shunt of high resistance.

The drawings illustrate diagrammatically the various circuit connections necessary for the control of the circuit for the objects stated.

Figure 1 diagrammatically illustrates parts of an automatic rheostat, controlled by a motor, for effecting the movement of a circuit closing lever;

Figure 1:
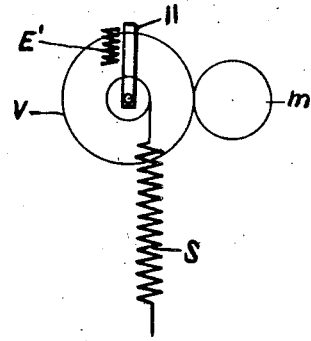
Figure 3:
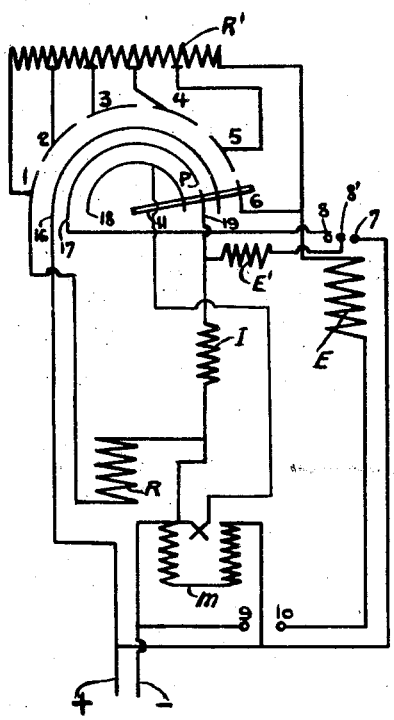
Fig. 3 is a circuit diagram embodying the elements illustrated in Figs. 1 and 2, and showing the circuit conditions after the work has been brought into the circuit.
Figure 4:
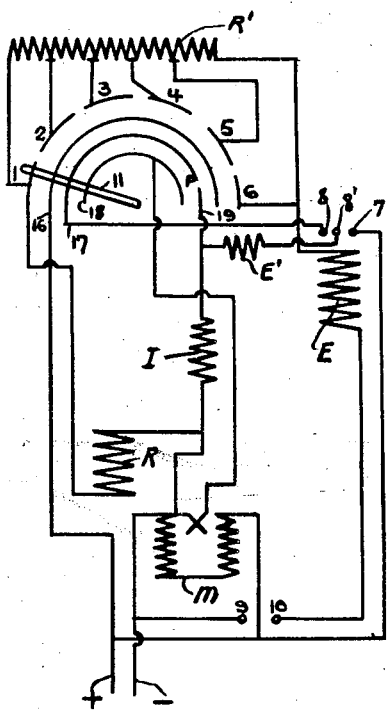
Fig. 4 is a diagram, similar to Fig. 3, illustrating the circuit conditions prior to the introduction of the work into, or after the removal of the work from, the circuit.

Referring to Figs. 3 and 4, it may be noted that the main lines of current coming from a suitable generator, adapted to provide a current of sufficient intensity for welding or the like, are indicated at plus and minus. The positive lead is serially connected with an arcuate contact bar 16, which is concentrically disposed with respect to similar contact bars 17 and 18 and with respect to a set of contact pieces, 1, 2, 3, 4, 5, and 6, which are arranged in the arc of a circle concentric to the arcuate contact bars 16. A contact lever 11 is pivotally mounted in the center of the circles defined by the contact bars 16, 17, 18, and by the combination of separate contact pieces 1 to 6 inclusive, and this lever is under the control of a mechanism illustrated diagrammatically in Fig. 1 of the drawings.

From this last named figure it will be seen that an electromotor, diagrammatically indicated at *m*, drives a diagrammatically indicated reduction gearing V, through which the lever 11 may be rotated, overcoming the action of the spring S. An electromagnet E', also diagrammatically shown, only serves for maintaining the circuit closing lever 11 in that position which the lever will occupy when it is moved from its original position by the introduction of "the work" between certain points of the circuit.

The terminals of the circuit between which the work is to be introduced are indicated in Figs. 3 and 4, at 9 and 10. Before this circuit is closed between the terminal points 9 and 10 through the introduction of the work, the current flows from the positive terminal through the arcuate contact member 16, the lever 11, to the arcuate contact piece 1, and from here into the resistance R back to the positive lead from the generator. Hence the entire current during these periods is consumed by the resistance R without causing any undue and excessive fluctuations in the current from the generator.

Figure 2:
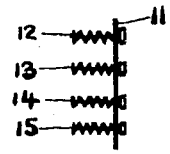
Fig. 2 is a diagrammatic illustration of a plurality of resistance elements in their relation to a circuit closing element for introducing them into the circuit or for removing them from the circuit.

If, however, the terminals 9, 10 are bridged through the introduction of the metallic elements which are to be welded together in the machine, the lead extending from the negative main wire through the terminal points 9, 10 into the electromagnet E will be included into a circuit which extends from the electromagnet E through a resistance R', the different divisions of which, diagrammatically indicated in Fig. 2 at 12, 13, 14, and 15, are connected with the contact pieces 2, 3, 4, and 5 respectively, so that, upon closure of the terminals 9, 10, the circuit containing the resistance R' is connected in multiple with the first described circuit containing the resistance R.

The following two circuits are then established in parallel to each other:

1. From the positive wire to the arcuate contact member 16, the lever 11, the contact member 1, the resistance R, to the negative main wire;

2. From the positive main lead to the arcuate contact member 16, the lever 11, the resistance R', the electromagnet E, the work inserted between the terminals 9, 10, to the negative wire from the generator.

The useful branch of the circuit; namely, the branch containing the work inserted between the terminals 9 and 10, therefore does not only include at the beginning of the operation the work introduced between the terminals 9 and 10, but also the full resistance R', which has the effect that upon closure of this useful branch of the circuit the work is connected in series with a relatively large resistance R', and the current intensity of this branch of the circuit, therefore, is considerably smaller than under normal working conditions, that is, under the conditions in which practically the entire current of the generator is to be consumed between the terminals 9 and 10.

The energization of the electromagnet E will cause the movement of a core (not shown), which core, through this movement, will close the gap between the terminals 7 and 8, whereby a current will flow from the positive main wire to the terminals 7 and 8, which are now in conductive connection, into the arcuate member 17, the lever 11, to the arcuate member 18, and from here to a wire which leads to the generator. As the field of this small motor is permanently shunted between the positive and negative main leads, the motor will begin to operate, overcoming the tension of the spring S, and will move the lever 11 from the contact member 1 to the contact member 2. In this position the resistance R', in series with the work located between the terminals 9 and 10, is decreased, as the current then flows from the positive main wire to the contact member 16, the lever 11, the contact piece 2 of the rheostat, through the resistance located between the contact pieces 2 and 6 into the electromagnet E, to the terminals 9 and 10, which are connected through the work, back to the negative main lead. At the same time, however, the resistance in shunt to the circuit just described is increased by the value of that resistance in the rheostat R' which is located between the two contact pieces 1 and 2. This shunt circuit now extends from the positive main lead to the contact member 16, the rheostat lever 11, the contact piece 2, the resistance portion of R' located between the contact pieces 2 and 1, to the contact piece 1, the resistance R', and back to the main negative B.

In this continued operation of the motor m, and while the work is held between the terminals 9 and 10, the resistance R' of the rheostat will therefore be gradually cut out from its series connection with the work located between the terminals 9 and 10 until the lever 11 has reached the contact piece 6, as indicated in Fig. 3 of the drawing. When this position has been reached, the main circuit, which now contains the work between the terminals 9 and 10, flows from the positive main lead into the contact member 16 of the rheostat, the lever 11, to the contact piece 6, the electromagnet E, to the work located between the terminals 9 and 10, and to the negative wire. The shunt circuit is now increased to considerable resistance, as it contains the entire resistance of the rheostat R' in series with the resistance R. This shunt extends from the main lead through the arcuate contact member 16, the lever 11, the contact piece 6, the various subdivisions 12, 13, 14, 15 of the resistance R' in series, the contact piece 1, the resistance R, and the negative main lead.

It will be noted in Fig. 3 that the lever has arrived at the contact point 19 after having gone across a gap, indicated at P, in the contact member 17. As the contact member 18 is permanently connected with the armature of the motor m, this armature is short circuited through the lever 11 and through the inductance I. This short circuit extends from the armature to the arcuate contact member 18, the lever 11, the contact piece 19, and the inductance I. The armature, therefore, ceases to rotate and the motor m becomes inactive. The electromagnet E', however, which serves for holding the lever 11 against the tension of the spring S in the terminal position indicated in Fig. 3, is energized by a current which flows from the positive main lead through the terminal point 7 and the terminal point 8', which also has been brought into conductive connection with the other two terminal points 7 and 8 by the core (not shown) of the electromagnet E; the current flowing from the terminal point 8' through the electromagnet E', and through the inductance I, to the negative main lead.

The withdrawal of the work from that position in which it connects the terminal points 9 and 10 opens the circuit through the electromagnet E, and the core (not shown), which has connected the terminal points 7, 8', and 8 will be withdrawn, the energization of both electromagnets E, E' will cease, and the lever 11 will be gradually returned to the starting position shown in Fig. 4, successively eliminating portions of the rheostat R' from serial connection with the resistance R until the entire current of the generator is then consumed by the last named resistance.

The system as described, therefore, provides in combination with a resistance permanently connected between the leads from the generator (immaterial whether work is introduced into the machine or not), an additional resistance, and means for gradually removing this additional resistance from serial connection with the work and introducing this additional resistance into serial connection with the first mentioned resistance.

Figure 5:
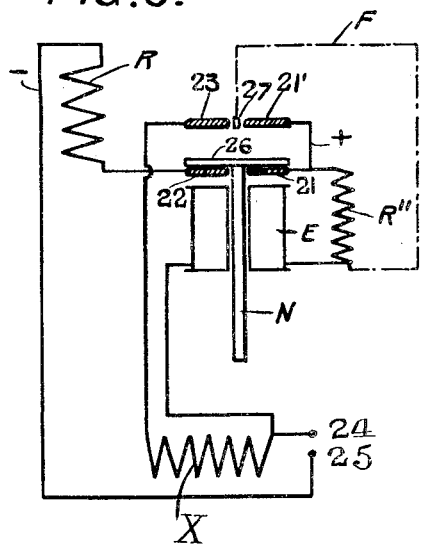
Figs. 5 and 6 are circuit diagrams of a modified circuit serving the same purpose and showing, respectively, the consumption of the current by resistance and the consumption of the current by the work introduced into the circuit, and Figs. 7 and 8, again, are modified circuit diagrams illustrating the same conditions of rest and operative period respectively.
Figure 6:
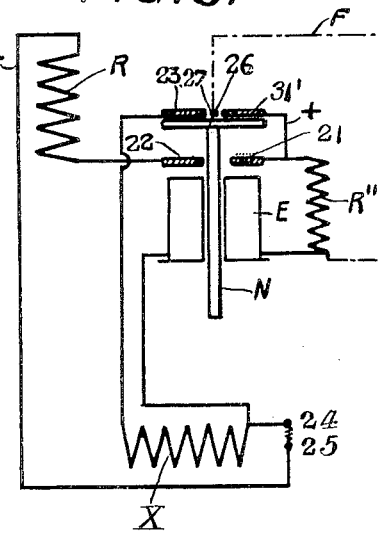

In the modifications illustrated by Figs. 5 and 6, an electromagnet E is shown which is provided with a core 26. This core has a plate normally connecting the contact pieces 21 and 22 when no current flows through the core. If, therefore, the two terminal points 24, 25, between which the work is to be introduced, are not conductively connected (a condition in which they are illustrated in Fig. 5), the current flows from the positive main lead, through the contact pieces 21 and 22 connected by the core 26, into the resistance R, to the negative lead. Upon closing the circuit, however, between the terminals 24 and 25 by the introduction of the work between these terminals, the electromagnet E will be energized through a current which flows from the positive main lead into a resistance R², serially connected with the windings of the electromagnet E, through said electromagnet, to the terminal points 24 and 25, and to the negative lead. The energization of the electromagnet E will cause the movement of the core N to a position in which the core 26, by means of its top plate, closes the circuit between contact plates 21' and 23. The contact plate 23 is serially connected with an additional resistance, which serves the purpose of protecting the electromagnet E against excessive flow of current, while the entire current flows through the work located between the terminal points 24 and 25, and part of this current is consumed by the resistance X, which is shunted about the electromagnet E. Prior to the completion of the shunt circuit, which includes the resistance X, an excessive flow of current through the electromagnet E is prevented, as this electromagnet is then serially connected with the resistance R''. The resistance R'' may then be disconnected, if desired, by short circuiting the same through a wire, indicated at F, which is connected with the terminal 27, located between the terminals 21' and 23; the conductive connection between the terminals 21' and 27 also being established through the core plate 26 of the armature N.

Figure 7:
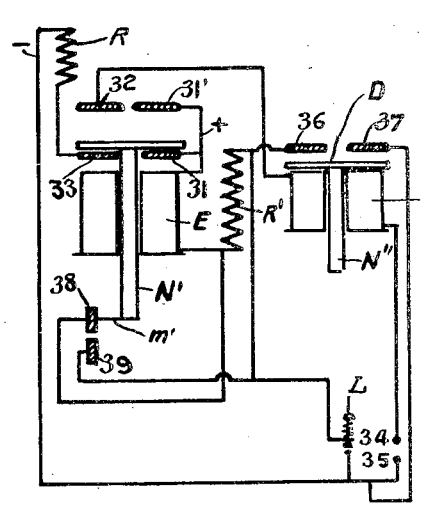
Figure 8:
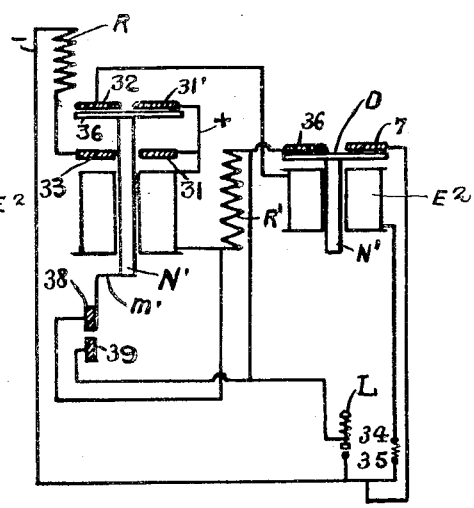

In the modification illustrated in Figs. 7 and 8, the current flows, prior to the insertion of the work between the terminal points 34 and 35, from the positive lead, to the contact point 31 and the contact point 33, into the resistance R, which is connected with the negative lead of the generator. The electromagnet E is provided with a movable plunger armature N', which has at its lower end a sliding contact m', connecting the two contact points 38 and 39 when the plunger is in the position illustrated in Fig. 7. A second electromagnet E'' is provided with a plunger armature N'', adapted to form a connection between the terminal points 36 and 37 by means of the top plate D when the electromagnet E'' is energized.

Upon insertion of the work between the terminal points 34 and 35, the electromagnet E will be energized, provided a switch L is closed. Before the switch is closed, however, the energization of the electromagnet E will not take place. The current flowing from the positive lead to the electromagnet E is continued through the contact pieces 38, 39, which are then connected by a sliding contact at the foot end of the plunger N', but as long as the switch L is open, the current does not find any continuation to the negative lead. The resistance R' also is at that time not connected into the circuit because the switch L is open.

If, however, the switch L is momentarily closed, the current flows through the electromagnet E, through the contacts 38 and 39, which are still in conductive connection by the slide contact at the foot end of the plunger armature, into the switch, and to the negative line. The resistance R' is shunted across the contact pieces 38 and 39, and at this instant of closing the switch L is therefore short circuited by the slide contact at the foot end of the plunger armature. For a very short period of time, therefore, it may be said that the current from the positive line flows through the contact elements 31 and 33, which are in conductive connection by the top plate of the armature, and into the resistance R. The electromagnet E is at this short period of time shunted to the resistance R, or also bridged between the main positive and negative line.

The energization of the electromagnet E will cause the armature N' to interrupt the connection between the contacts 31 and 33 and to close the connection between the contacts 31' and 32. As the electromagnet E has lifted the slide contact m' from its position in which it connects the contact members 38 and 39, the current will then flow from the positive main line, through the electromagnet, into the resistance R', to the switch L, and back to the negative line. The passage of an excessive current through the electromagnet E is in this instance prevented owing to the connection of the resistance R' in series with the electromagnet E.

If the work has been inserted between 34 and 35 after the armature plunger N' has effected closure of the circuit through the contacts 31' and 32, the current will flow from the positive main lead, to the contact points 31' and 32, into the electromagnet E², to the work located between 34 and 35, and back to the negative line. The energization of the electromagnet E² will produce movement of the armature plunger N', whereby the top plate D of said armature plunger connects the contacts 36 and 37. The energization of the electromagnet E, however, is not interrupted, as the current through said electromagnet then flows from the positive main lead into the electromagnet, the resistance R', the contact plate 36, the armature plate D, and through the contact plate 37 back to the negative line. The armature of the electromagnet E, therefore, will be maintained owing to the energization of this electromagnet in the position shown in Fig. 8, and the electromagnet will not be subject to the flow of an excessive current, as it is in serial connection with the resistance R'. As this resistance is relatively large, the shunt circuit formed by the serial combination of the electromagnet E and the resistance R' will not consume very much of the current, so that by far the largest part of the current may flow through the other branch of the circuit in which the work is located between the contact points 34 and 35.

I claim:

1. In a system for electric welding, the combination with a positive and a negative main line, of a resistance adapted to consume the entire current when the "work" is removed from the circuit, an electromagnet shunted between the main lines, means controlled by said electromagnet for directing the current through the "work", and means under the control of the "work" for maintaining said electromagnet energized.

2. In a system for electric welding, the combination with a positive and negative main line, of a resistance adapted to consume the entire current when the "work" is removed from the circuit, an electromagnet shunted between the main lines, means controlled by said electromagnet for decreasing the flow of current through said resistance and for directing the current through the "work" increased in the proportion in which it has been decreased in the resistance, and means under the control of the "work" for maintaining said electromagnet energized.

3. In a system for electric welding, the combination with a positive and a negative main line, of a resistance adapted to consume the current necessary for the welding operation when the "work" is removed from the circuit, an electromagnet shunted between the main lines, an armature operatively associated with said electromagnet, a pair of contacts adapted for conductive connection by said armature upon energization of said magnet, means for entirely cutting off the current through said resistance upon connection of said contacts by said armature, and means automatically operative upon introduction of the "work" into the circuit for maintaining said electromagnet energized.

4. In a system for electric welding, the combination with a positive and a negative main line, of a resistance large enough to consume a current of the intensity of the welding current, said resistance being connected across the lines, an electromagnet, means under control of said electromagnet for disconnecting said resistance from the main lines, and means under control of the work for energizing said electromagnet and for maintaining it energized, the means for disconnecting said resistance upon energization of said electromagnet becoming operative to connect said resistance between the lines upon removal of the "work" from the circuit.

5. In a system for electric welding, the combination with a positive and a negative main line, of a resistance large enough to consume a current of the intensity of the welding current, said resistance being connected across the lines, an electromagnet, means under control of the electromagnet for disconnecting the resistance from the main lines, means under control of the "work" for energizing said electromagnet, and means under control of the electromagnet operative upon energization of the same for preventing the flow of the entire welding current therethrough when said electromagnet is serially connected with the work.

In testimony whereof I affix my signature in presence of two witnesses.

SANTO RUMOLINO.

Witnesses:
 Pio Minaldini,
 Quincy F. Roberts.